Aug. 19, 1958 W. W. PHARIS 2,848,546

ADAPTER CIRCUITS FOR MIXED TYPES TELEPHONE SYSTEM

Filed Dec. 7, 1955 3 Sheets-Sheet 1

INVENTOR
WILLIAM W. PHARIS
BY
Francis E. Blake
ATTORNEY

Aug. 19, 1958 W. W. PHARIS 2,848,546

ADAPTER CIRCUITS FOR MIXED TYPES TELEPHONE SYSTEM

Filed Dec. 7, 1955 3 Sheets-Sheet 2

INVENTOR
WILLIAM W. PHARIS
BY
Francis E. Blake
ATTORNEY

Aug. 19, 1958 W. W. PHARIS 2,848,546

ADAPTER CIRCUITS FOR MIXED TYPES TELEPHONE SYSTEM

Filed Dec. 7, 1955 3 Sheets-Sheet 3

INVENTOR
WILLIAM W. PHARIS
BY
Francis E Blake
ATTORNEY 2,848,546

ADAPTER CIRCUITS FOR MIXED TYPES TELEPHONE SYSTEM

William W. Pharis, Rochester, N. Y., assignor to General Dynamics Corporation, a corporation of Delaware Application December 7, 1955, Serial No. 551,487

2 Claims. (Cl. 179—16)

This invention relates to telecommunication systems and particularly to dial telephone systems where connections are extended by switching means controlled by trains of pulses characterized by the numbers of pulses in the said trains.

The object of the invention is to provide means for adapting apparatus designed for one system to work within another and different systems. In specific detail the object of the invention is to provide adapting circuits to translate the control of loop dialing circuits to control of the so-called resistance battery circuits. The loop dialing circuits wherein a selective switch responds to a series of momentary breaks in a bridge established across the two wires of a talking circuit are conventional. Likewise the resistance battery circuits wherein a selective switch responds to a series of momentary applications of battery potential to but one wire of a two wire talking circuit are conventional. The present invention resides in adapter circuits for translating trains of pulses of one nature into trains of pulses of another nature, one such adapter circuit being provided to translate loop dialing pulses into resistance battery pulses and another being provided to translate resistance battery pulses into loop dialing pulses.

Hereinafter for short identification and clear understanding, the loop dialing system in which a selective switch is seized by throwing a loop across the talking circuit thereof and then systematically opening said loop for a series of short intervals closely spaced, will be referred to as the XY system. The resistance battery system in which a selective switch is seized by making its private wire busy (i. e. grounded) and where such switch is thereafter operated by systematically applying battery potential for a series of short intervals closely spaced to but one of the wires of its talking circuit, will be referred to as the NE system.

A feature of the invention is an adapter circuit having means therein responsive to all the signals produced by a first system for producing corresponding but different signals in a second system and having means responsive to reaction signals in said second system for producing corresponding but different signals in said first system.

In accordance with one embodiment of the invention, an adapter circuit is provided for working NE type circuits from XY type circuits. In this form a calling bridge relay and its slow releasing follower is provided to be conventionally responsive to loop dialing pulses transmitted from the XY type circuits. Each open circuit pulse from the XY circuit is then translated to a momentary application of battery thereupon transmitted over but a single conductor of the talking circuit leading into the NE type circuits, the other conductor of this talking circuit being completely opened for the duration of the pulse train.

In accordance with another embodiment of this invention, an adapter circuit is provided for working XY type circuits from NE type circuits. In this form a relay reached over the private wire of the NE type circuit will operate and throw a bridge across the talking conductors of the circuit leading in to the XY circuits. A relay on one of the conductors of the NE circuit will thereafter control this bridge circuit so as to translate the series of momentary operations of such relay into a series of breaks in said bridge circuit.

A feature of this latter embodiment is a means in the releasing circuits for holding the NE circuit marked as busy until the distant XY circuit is fully released despite the fact that the NE selector is released as soon as the calling party hangs up. In accordance with this feature, when the calling party hangs up the NE selector is released and this removes ground from its private wire, whereupon the relay in the adapter circuit used, as above described, to throw a bridge across the XY talking circuit, is released thus opening such bridge. However, the ground on the private wire of the XY circuit may be maintained under control of the called party and in this case such ground maintains a relay in the bridge circuit operated so that ground is immediately reapplied to the private wire of the NE circuit to mark the circuit leading to the XY circuit busy until the called party hangs up.

Other features will appear hereinafter.

The drawings consist of three sheets having two principal figures and two composite figures each showing eleven thumbnail sketches in proper relationship with the said two principal figures, as follows;

Fig. 1 is a schematic circuit diagram of an adapter circuit to be used for incoming calls from an NE type system to desired called stations in an XY type system;

The operation of the adapter circuits of the present invention, which are wired to the incoming circuits of one type of system and appear in the bank terminals of selectors of the other type system may be explained as follows.

*From XY to NE*

Figure 1:
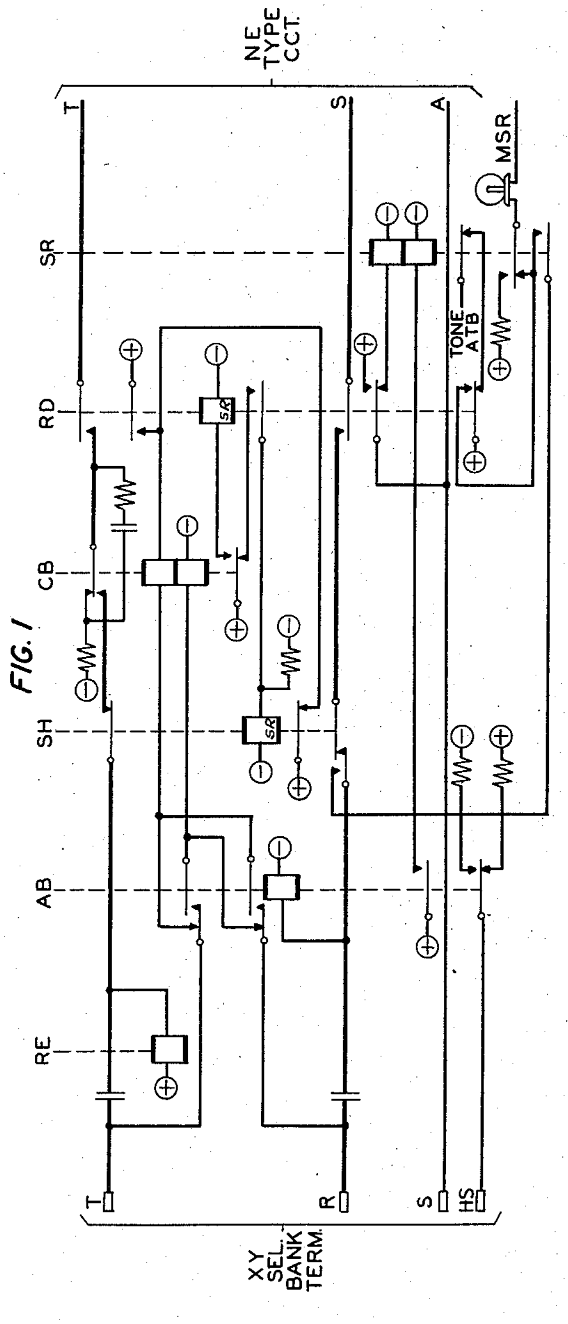
Fig. 1 is a schematic circuit diagram of an adapter circuit to be used for incoming calls from an XY type system to desired called stations in an NE type system.

On traffic from an XY system to an NE system the circuit of Fig. 1 is used whereby the T, R, S and HS brushes of a stepping switch are moved over the corresponding terminals in the switch bank in order to select and use an NE type selector circuit having the three incoming terminals designated T, S and A, the terminals T and S constituting the talking circuit and the A constituting the so-called private wire. The operation of this adapter circuit may be seen by the help of a number of small skeleton drawings showing certain vital connections within the XY system and the NE system at different stages of the operations.

Figs. 1–J and 1–K show the busy and the idle conditions respectively of an NE selector circuit. A ground on the A wire denotes a busy condition, whereas a battery connection denotes an idle condition and this ground or battery connection is extended through the circuit of Fig. 1 to the S wire terminal in the selector banks of the XY system switches.

Looking at the Fig. 1–A it will be seen that at the start of the trunk hunting operation a connection is made from a ground on an armature of the RD (release delay) relay, the front contact thereof through the SW relay and thence through the winding of the HA relay. The SW relay is of comparatively high resistance and the HA relay is of comparatively low resistance so that dependence cannot be placed on the circuit just described to operate the HA relay. If the first outgoing line (to a Fig. 1–J) is busy, then a ground will be returned over an armature and back contact of the SW relay to the connection between the SW and the HA relays whereby the SW relay is shortcircuited and prevented from operating and whereby the HA relay is operated to control the further secondary movement of this selector. Thus so long as busy lines are encountered the HA relay will operate to control the step by step advance of the selector whereas the SW relay will not operate, thus maintaining the testing circuit from the S brush to the HA relay. When an idle line is found, the HA relay will not respond but now that the short circuit is removed from around the SW relay this relay operates and immediately and directly grounds the S terminal and holds the SW relay operated through the low resistance winding of the HA relay. This circuit will be maintained until the holding ground is returned over the S wire to hold the connection as indicated in Fig. 1–D.

Fig. 1–B is labelled "Seizing" and indicates the circuits established upon the finding of an idle trunk. At this time the direct ground applied to the S wire of the XY system is extended to the A wire of the NE system to establish the condition indicated in Fig. 1–L, which by the way is the same as shown in Fig. 1–J. Also in Fig. 1–B it will be noted that the T and R wires are bridged whereby the CB relay in Fig. 1 will be operated. The RD relay, the first slow relay, immediately follows and returns a ground over the S lead.

With the CB and RD relays of Fig. 1 operated, the T lead to the NE circuit Fig. 1–L will be connected through the coil RE to ground, at present without result and the S lead from the NE system Fig. 1–L will be connected through the winding of the AB relay also at present without result. These conditions will be maintained until dialing over the XY circuits takes place.

Dialing is indicated in Fig. 1–C, and this conventionally consists of a train of pulses each consisting of a releasing of the CB relay to produce a momentary open circuit which causes a release of the CB relay in Fig. 1. Thus the CB relay releases for each pulse but the RD relay remains operated. Hence a circuit is closed from ground, the armature and back contact of the CB relay, a front contact and armature of the RD relay and through the winding of the SH relay to battery. As a consequence the S lead to the NE circuit Fig. 1–M is opened and a series of battery pulses from a back contact of the CB relay are each applied to the T lead to Fig. 1–M to operate the pulsing relay therein. After the proper rotary selection is made within the NE circuit, the vertical selection is automatically made in the conventional manner.

The talking circuit is then established as indicated in Figs. 1–D and 1–N. Battery feed for the calling subscriber in the XY end of the connection is supplied through the coils of the CB relay and this may be reversed by the AB relay for conventional purposes. Talking battery for the called subscriber in the NE end of the connection is supplied by the grounded coil RE and the winding of the AB relay. The answer of the called subscriber operates the AB relay which biases the SR relay and reverses the polarity of the HS connection also for conventional supervisory purposes.

The release of the connection, as indicated by Figs. 1–E and 1–P, is under control of the calling subscriber. When this subscriber hangs up the CB relay releases and this is followed by the RD relay which then removes ground from the S lead to the XY circuit, thus releasing the SW relay and taking the guarding ground from the A lead of the NE circuit.

*From NE to XY*

Figure 2:
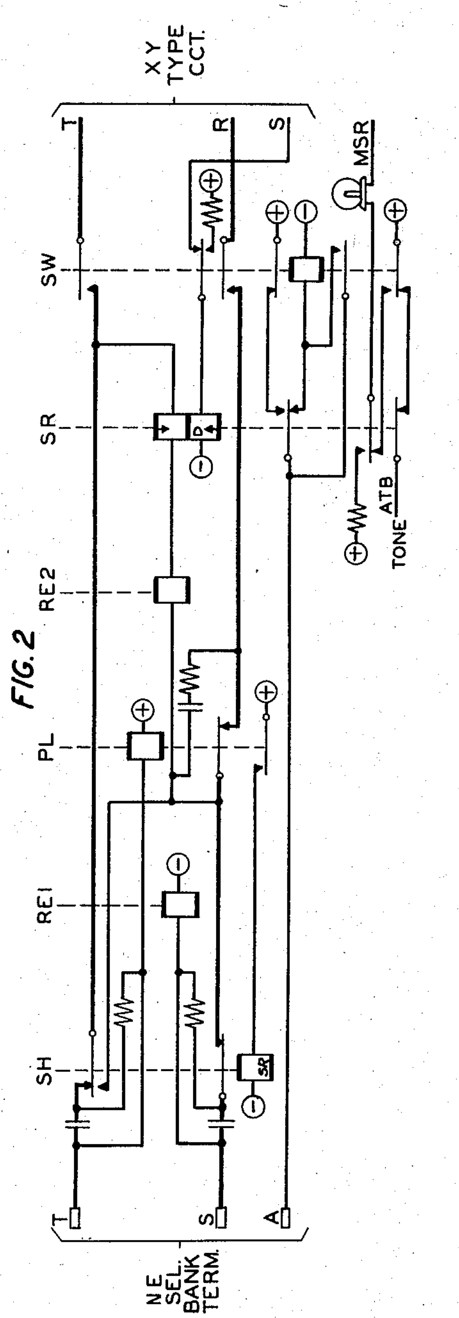
Figs. 2A to 2P inclusive are the counterparts of Figs. 1A to 1P inclusive except that they are arranged to show connections established from calling lines in an NE type system to called lines in an XY type system.
Figures 1, 1A, 1B, 1C, 1D, 1E, 1J, 1K, 1L, 1M, 1N, 1P:
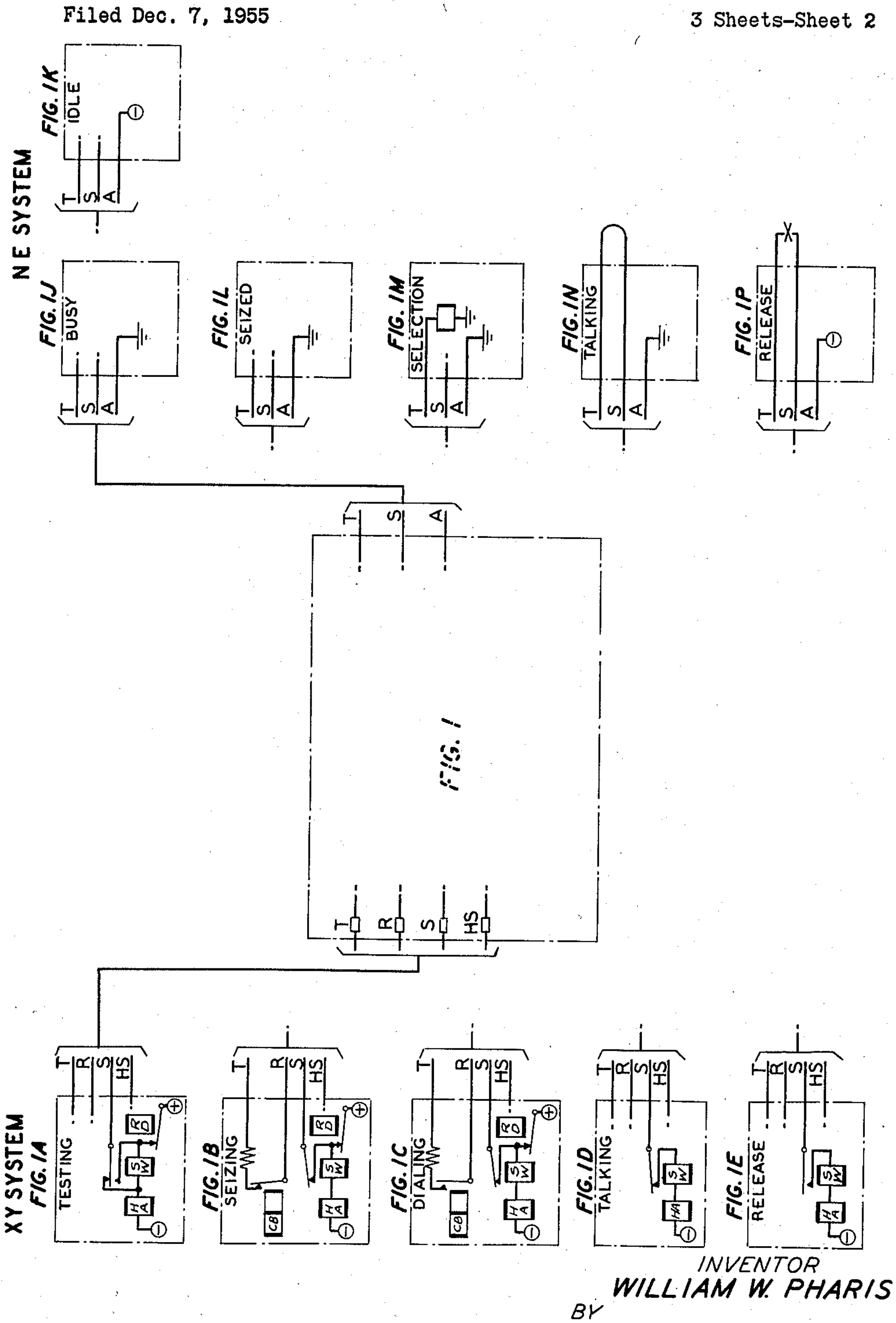
Fig. 1A is a thumbnail sketch of the schematic circuit diagram of an XY selector showing the essential elements while trunk hunting, particularly as busy lines (Fig. 1J) are encountered and making clear the reaction to an encounter with an idle line (Fig. 1K)
Fig. 1B is a thumbnail sketch of the schematic circuit diagram of an XY selector showing the principal circuit conditions just after the seizure of an idle line.
Fig. 1C is a thumbnail sketch of the schematic circuit diagram of an XY selector showing the loop dialing circuit.
Fig. 1D is a thumbnail sketch of the schematic circuit diagram of an XY selector showing the essential circuitry during the talking period.
Fig. 1E is a thumbnail sketch of the schematic circuit diagram of an XY selector showing the reaction therein to the release signal as the called party hangs up.
Fig. 1J is a thumbnail sketch of the schematic circuit diagram of a selector of an NE type system showing the circuit condition of a busy line.
Fig. 1K is a thumbnail sketch of the schematic circuit diagram of a selector in an NE type system showing the circuit condition of an idle line.
Fig. 1L is a thumbnail sketch of the schematic circuit diagram of an NE type selector showing the circuit conditions therein upon seizure.
Fig. 1M is a thumbnail sketch of the schematic circuit diagram of an NE type selector showing the circuitry responsive to incoming dial pulses.
Fig. 1N is a thumbnail sketch of the schematic circuit diagram of an NE type selector showing the essential conditions of the circuitry during the talking period.
Fig. 1P is a thumbnail sketch of the schematic circuit diagram of an NE type selector showing the circuit changes taking place upon the release by the called subscriber.
Figures 2, 2A, 2B, 2C, 2D, 2E, 2J, 2K, 2L, 2M, 2N, 2P:
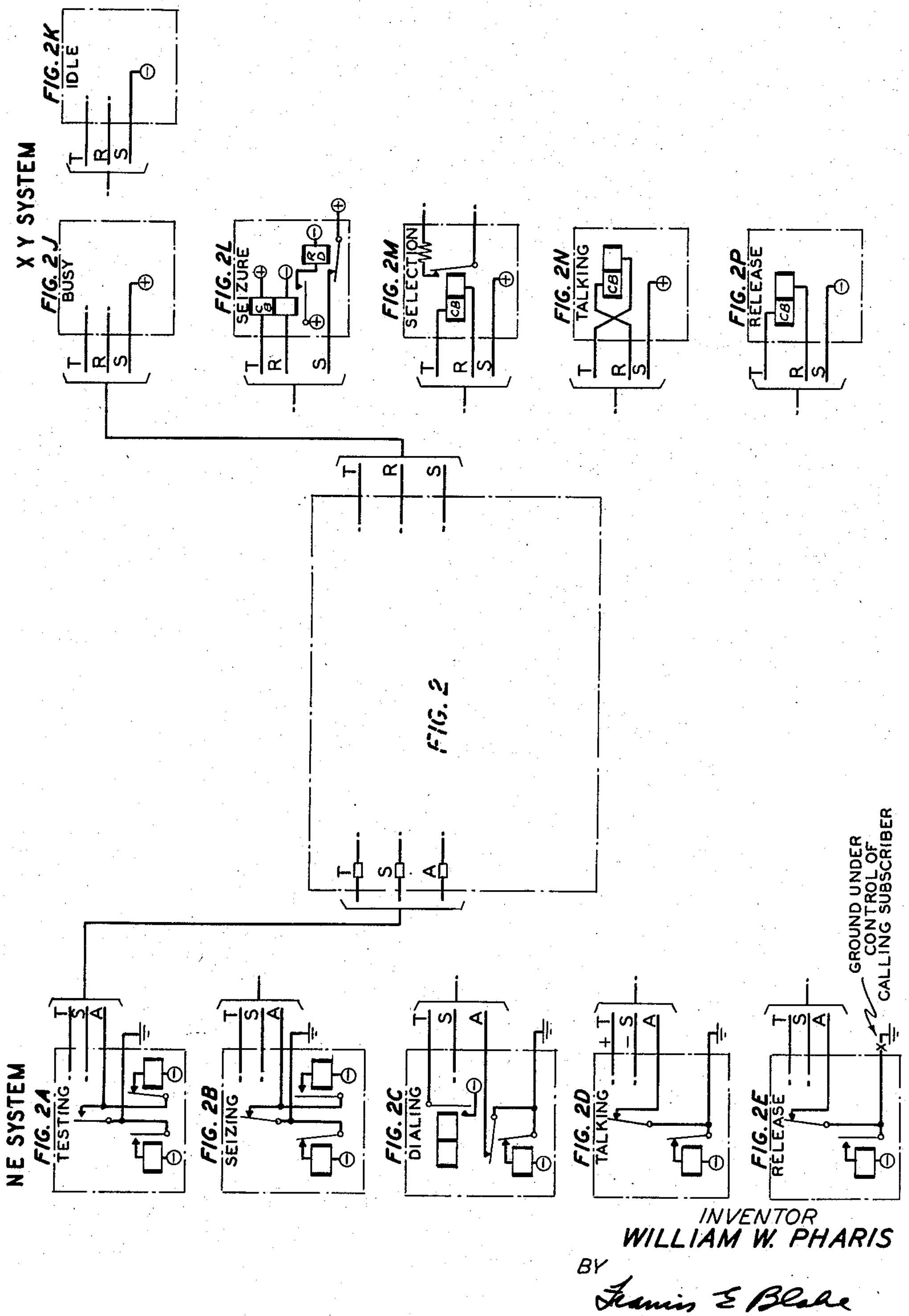

Fig. 2 showing the circuit for adapting the NE type system to work into the circuits of the XY system may also be explained with the help of a number of skeleton circuits showing the vital connections in each of these systems at different times. The XY system circuits show an idle condition by battery on the S wire and a busy condition by a ground on the S wire. Therefore, when a selector in the NE system is seeking an idle line, it has a testing relay locked to its A wire and this relay will remain so operated until an idle line is reached whereupon it will release. The ground on the S wire of the XY system, during the time the SW relay in Fig. 2 is released, will operate the SR relay through its lower winding and thus extend a ground from a back contact and armature of the SW relay to the A lead in the selector banks of the NE system. When the SW relay has become operated it depends on the ground from the A lead of the NE circuits to hold it operated. Therefore, when a search for an idle XY line is being made the busy or idle condition as depicted in Figs. 2–J and 2–K are encountered. During the hunting a battery connected relay in the NE circuit is tied through its own armature and contact to the A lead so that when an idle line is found this relay will release and in so doing will be instrumental in grounding the A lead as shown in Fig. 2–B. This ground on lead A will cause the operation of the SW relay which will then bridge a back contact and armature of the SR relay so that the SW relay will depend during the conversation when the SR relay is operated on its own armature for continued operation.

When the SW relay operates, the SR relay is biased over a front contact and armature of the SW relay so that when the called subscriber answers and causes a reversal of the line the SR relay will respond.

However, when the XY selector circuit is seized after being found idle, the SW relay in operating bridges the line from T, an armature and front contact of the SW relay, the upper winding of the SR relay, the RE2 coil, an armature and back contact of the PL relay, a front contact and armature of the SW relay to the R conductor. Current from the calling bridge relay in the XY circuit will flow through this circuit and will operate the CB relay therein. When the subscriber in the NE system dials, the dial pulses will take the form of a series of applications of battery to the T wire. This will operate the PL relay once for each said pulse and this series of pulses, as a train, will operate the slow releasing relay SH which functions to short circuit the upper winding of the SR relay and the coil RE2 for the better transmission of pulses into the XY circuits. Each operation of the PL relay is translated into an opening of the bridge toward the XY circuits. Thus the series of battery pulses on the T wire of the NE circuits is translated into an equal length opening of the bridge placed across the T and R wires of the XY circuits which thereupon respond in the conventional manner. When the called party answers, the line is reversed, whereupon the SR relay operates, leaving the SW relay dependent on its own front contact so that when the calling party releases and thereby removes the ground from the A wire as depicted in Fig. 2–E, the SW relay will release and by so doing will open the bridge toward the XY circuit.

If the calling party hangs up first, then the NE type selectors are released and the SW relay in Fig. 2 is released, whereby ground is placed on the A selector bank terminal to mark this line as busy until the called subscriber hangs up. As the SW relay releases, the lower winding of the SR relay is strongly energized to operate this relay directly and make it responsive to the ground on the S wire returned from the XY connector until this is removed by the hanging up of the called subscriber.

What is claimed is:

1. In a telecommunication system, selector switches having terminals in their banks leading to a two wire talking circuit and a single private wire circuit, an adapter circuit connected to a set of said bank terminals and extending to a selective switch having a two wire talking circuit and a single private wire circuit, means for seizing one of said adapter circuits selected by one of said selector switches and for holding it busy by the application of ground to its said private wire, means responsive to said seizure to bridge the talking wires of said selective switch, means in each said selector switch for pulsing into said adapter circuit by battery pulses over one wire of said two wire talking circuit, means in said adapter circuit for translating said train of battery pulses into a train of open circuit pulses in a bridge established across said talking wires of said selective switch, means in said selective switch responsive to the establishment of said bridge to return a ground on said private wire, means in said selector switch responsive to release by a calling subscriber for releasing said ground connection to said private wire and for releasing said selector switch, means in said adapter circuit for immediately thereafter establishing a ground connection to said private wire terminal in the bank of said released selector switch, and means for maintaining said last ground connection under control of a called subscriber reached by said seized selective switch.

2. In a telecommunication system a selector switch settable by trains of battery pulses transmitted over a single wire into said switch and seizable and holdable by a ground connection established to its private wire, a plurality of circuits connected to the bank terminals of said switch each having a pair of talking conductors and a private wire, one or more of said circuits constituting adapter circuits and each leading to a selective switch for further extending a connection, each said selective switch being settable by trains of pulses constituting momentary open circuit intervals in a bridge across said talking circuit, seizable by the establishment of a said bridge and holdable by the maintenance of said bridge, means responsive to release by a calling subscriber for removing said holding ground connection to said first selector switch for releasing said first selector, a means in said adapter circuit responsive to said release of said holding ground connection for establishing an alternative ground connection to said private wire circuit for marking said adapter circuit appearance in said selector bank terminals as busy, and means in said selective switch under control of a called subscriber for releasing said last mentioned busy connection.

References Cited in the file of this patent

UNITED STATES PATENTS

| | | |
|---|---|---|
| 1,747,402 | Tharp | Feb. 18, 1930 |
| 2,247,055 | Hovlan | June 24, 1941 |